United States Patent [19]
Keesen

[11] Patent Number: 5,274,449
[45] Date of Patent: Dec. 28, 1993

[54] LETTERBOX TELEVISION SIGNAL WITH EDGE REGIONS CONTAINING TRANSFORMED PIXEL VALUES

[75] Inventor: Heinz-Werner Keesen, Hannover, Fed. Rep. of Germany

[73] Assignee: Deutsche Thomson-Brandt GmbH, Fed. Rep. of Germany

[21] Appl. No.: 890,638

[22] Filed: Apr. 10, 1992

Related U.S. Application Data

[63] Continuation at PCT/EP90/01468, filed Sep. 1, 1990.

[30] Foreign Application Priority Data

Sep. 8, 1989 [DE] Fed. Rep. of Germany ....... 3929967

[51] Int. Cl.$^5$ .......................... H04N 7/04; H04N 7/00
[52] U.S. Cl. ..................................... 358/141; 358/167
[58] Field of Search .................. 358/141, 12, 167, 36, 358/133; 375/60, 122

[56] References Cited

U.S. PATENT DOCUMENTS

| | | | |
|---|---|---|---|
| 4,961,112 | 10/1990 | Sugimeri et al. | 358/141 |
| 4,984,078 | 1/1991 | Skinner et al. | 358/141 |
| 5,097,332 | 3/1992 | Faroudja | 358/141 |
| 5,128,758 | 7/1992 | Azadegon et al. | 358/133 |

FOREIGN PATENT DOCUMENTS

| | | |
|---|---|---|
| 3414452 | 10/1985 | Fed. Rep. of Germany. |
| 3840054 | 7/1989 | Fed. Rep. of Germany. |
| 3841173 | 11/1989 | Fed. Rep. of Germany. |

OTHER PUBLICATIONS

Schreiber, William F., "6-MHz Single-Channel HDTV Systems", HDTV Symposium, Ottawa, Oct. 1987, pp. 1-10.

Cucchi et al., "DCT-Based Television Codec for DS3 Digital Transmission", SMPTE Journal, Sep. 1989, pp. 640-646.

"Wide Aspect Screen NTSC Compatible EDTV", by Y. Araki et al., IEEE 1989 Int. Conf. on Consumer Electronics; Digest of Technical Papers, ICCE; Rosemont, Ill., Jun. 6-9, 1989, pp. 8-9.

"Compatible HDTV Coding for Broadband ISDN", by K. Tzou et al., IEEE Global Telecommunications Conf. & Exhibition, Hollywood, Fla., Nov. 28-Dec. 1, 1988; vol. 2, pp. 24.1.1-24.1.7.

*Primary Examiner*—James J. Groody
*Assistant Examiner*—Safet Metjahic
*Attorney, Agent, or Firm*—Joseph S. Tripoli; Eric P. Herrmann; Ronald H. Kurdyla

[57] ABSTRACT

In a system for generating a compatible television signal with a "letterbox" display format, groups of vertically arranged picture elements (pels) are subjected to vertical DCT transformation producing eight DCT coefficients. Intermediate sixth and seventh coefficients are placed in the letterbox bar regions. The remaining six coefficients, namely the first through fifth coefficients and the highest frequency eighth coefficient, are inverse DCT transformed and processed with the main image information. A standard aspect ratio receiver displays a letterbox image using only the remaining six coefficients. A wide aspect ratio receiver uses the six remaining coefficients with the two coefficients from the bar regions, after inverse DCT, to produce a full resolution wide aspect ratio image.

14 Claims, 3 Drawing Sheets

LETTERBOX TELEVISION SIGNAL WITH EDGE REGIONS CONTAINING TRANSFORMED PIXEL VALUES

This is a continuation of PCT application PCT/EP 90/01468 filed Sep. 1, 1990 by Heinz-Werner Keesen and titled TV Transmission System.

FIELD OF THE INVENTION

The present invention concerns coder/decoder method and apparatus for transmitting and receiving a coded television signal which is compatible with standard television signal processing apparatus.

BACKGROUND OF THE INVENTION

The introduction of a 16:9 wide aspect ratio picture format into existing broadcast television standards (e.g., PAL, SECAM, NTSC) having a standard 4:3 aspect ratio has resulted in a so-called "letter-box" image display format. This format has been discussed, for example, in "Possible Improvements and Trends for Development with PAL", G. Holoch, lecture FKTG Jan. 17, 1989 in Berlin, Germany; "Future Television Systems", F. Müller-Römer, Fernseh-und Kinotechnik, Vol. 43, issue No. 6/1989; and in "New Ways of the Old PAL", Dr. A. Ziemer, et al., Funkschau issue No. 18/1989. With the letterbox format, the total picture information from an original 16:9 widescreen source is displayed by a 4:3 receiver compatibly, with bars along the upper and lower edges of an image display exhibiting a 16:9 aspect ratio. The bar regions typically do not contain visible image information.

Letterbox coding at the studio involves, for example, removing every fourth line of a 575 active line image frame of a 16:9 widescreen image with, for example, 625 total lines. Certain lines are transmitted as additional information in the bar regions that are produced above and below the active image region as a result of the line removal process. The active picture area in a 4:3 receiver display then contains 431 lines, and the edge bar regions each contain 72 lines. The letterbox format for displaying widescreen 16:9 material by a 4:3 receiver is well known and requires no adaptation by a viewer of a standard receiver display.

Because the ratio of the two picture formats corresponds to the ratio of the original number of lines to the reduced number of lines, geometrical distortion otherwise produced by removing image lines is compensated for. The 16:9 widescreen receiver processes the information contained in the two edge bar regions for increasing the number of active image lines back to the original number (575 in this example), thereby creating a widescreen 16:9 picture display covering the entire display area of a widescreen display device.

Removing one out of four image lines from 575 active image lines in a frame to produce a compatible letterbox signal format creates signal artifacts and distortions that are visible in a 4:3 receiver display as, for example, diagonal artifacts or distorted image motion. To reduce or eliminate such effects, the lines can be vertically interpolated at the transmitter. However, this usually leads to reduced vertical resolution in a 4:3 receiver display.

To prevent the image information content of the lines disposed in the edge bar regions from becoming disturbingly visible at a 4:3 receiver, the amplitude of the image information in the bar regions may be attenuated at the transmitter by about 13 dB, and expanded accordingly at a 16:9 receiver. However, this can lead to increased noise in a 16:9 receiver display and, thereby, to reduced picture quality compared with a standard 4:3 receiver display.

A system for digital coding and transmission of EQTV signals in ISDN networks is described in "Compatible HDTV Coding for Broadband ISDN", K. H. Tzou et al., IEEE Global Telecommunications Conference & Exhibition, Nov. 28, 1988. In that system, a reduced definition EQTV picture is extracted from a high definition image by means of a two dimensional discrete cosine transform (DCT), digitally coded, and transmitted in data compressed form. An auxiliary channel conveys additional information by means of which a high definition image can be reconstructed by a high definition ISDN receiver. Portions of a 16:9 image exceeding the 4:3 format are also transmitted in the auxiliary channel. A 4:3 EQTV receiver reproduces only a part of the 16:9 image.

In accordance with the principles of the present invention, it is herein recognized as desirable to provide a compatible transmission system for a 16:9 aspect ratio television signal using a standard television channel which supplies letterbox format images for display by 4:3 aspect ratio standard receivers, and widescreen 16:9 aspect ratio images for use by 16:9 receivers, in particular with vertical image resolution substantially corresponding to that of the original image and with a low noise characteristic.

SUMMARY OF THE INVENTION

In an illustrated preferred embodiment of a system according to the present invention, at a transmitter encoder, a television signal with 575 active image lines and a 16:9 image aspect ratio is converted from analog to digital form. Image frame information is vertically processed by means of DCT (discrete cosine transform) processing, for example, which produces eight coefficients. Of the eight coefficients generated, the first through the fifth and the eighth coefficients are processed together as six coefficients. These six coefficients are inverse DCT transformed, converted back to analog form, and used in the processing of 16:9 letterbox image information to be displayed by a standard 4:3 receiver. As a result, the 4:3 receiver display exhibits substantially full vertical image resolution. Also at the transmitter endoder, the sixth and seventh DCT coefficients are conveyed in the letterbox bar regions above and below the 16:9 image to be displayed in the letterbox format by the standard receiver.

The standard 4:3 receiver does not process the (sixth and seventh) coefficients contained in the bar regions, and only displays the letterboxed 16:9 television image. Since most of the energy of a DCT transform is concentrated in the lower order coefficients, the sixth and seventh coefficients usually have small amplitudes. As a result, the visibility of potentially disturbing information in the bar regions of the letterbox format image displayed by a standard 4:3 receiver is reduced. The amplitude of the information in the bar regions need be reduced only slightly or not at all, thereby contributing little or no noise increase in a 16:9 receiver display.

The amplitudes of the DCT coefficients in the bar regions can be reduced using a non-linear compression function (with an inverse non-linear amplitude expansion in a 16:9 receiver) to further reduce their visibility in the 4:3 receiver letterbox display. Non-linear compression and expansion, whereby large amplitudes are compressed to a greater extent than smaller amplitudes, produces a smaller increase of noise in a 16:9 receiver display compared to the results obtained using linear compression and expansion.

An improved 16:9 receiver contains a decoder which processes the additional information found in the two edge bar regions, and develops a full-format 16:9 picture. The received television signal is converted to digital form, and DCT-transformed vertically using six DCT coefficients in each image frame. The sixth coefficient is shifted to the eighth position, and the original sixth and seventh coefficients conveyed in the edge bar regions are inserted into the sixth and seventh positions, thereby reconstituting the original eight DCT coefficients. These are inversely DCT transformed and inserted into the original positions as in the original signal. Following subsequent digital-to-analog conversion, the 16:9 image information exhibits full vertical resolution and only slightly increased noise.

DETAILED DESCRIPTION OF THE DRAWINGS

Figure 1:
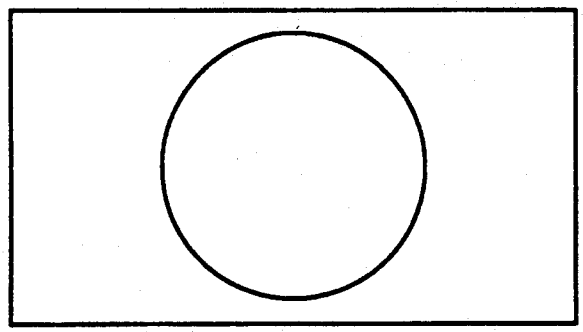
FIG. 1 illustrates a circular image against a (16:9) wide image aspect ratio background.

FIG. 1 depicts a television image with a 16:9 wide image aspect ratio, such as may be generated in a broadcast television studio.

Figure 2:
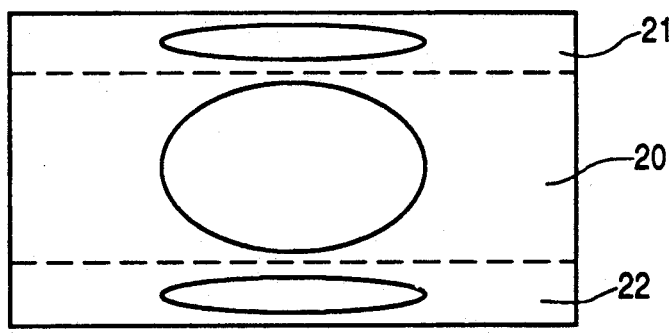
FIG. 2 illustrates the image of FIG. 1 with a vertically compressed active image region and additional information conveyed in upper and lower edge bar regions.

FIG. 2 shows the television image of FIG. 1 vertically compressed into an area 20 by means of a 16:9 letterbox coder, as is known. In this example vertical compression is by a factor 4/3, whereby 431 active image lines are generated from the 575 active lines in FIG. 1, forming active image region 20 for display by a standard 4:3 receiver. This compression is accomplished by removing every fourth line from the original image (FIG. 1), or by means of a vertical interpolation. The vertical compression alters the spatial geometry of the circular image component. Lines removed from active area 20, or lines required for decoding in a widescreen 16:9 receiver, are transmitted as additional signal components in two bar regions 21 and 22 along upper and lower edges of active image area 20.

Figure 3:
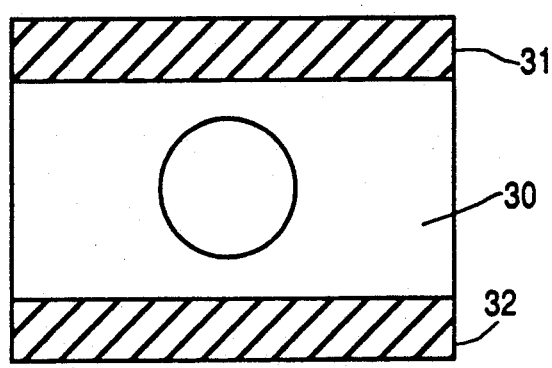
FIG. 3 depicts the active image region of FIG. 2 as displayed in a letterbox format by a standard 4:3 aspect ratio receiver.

FIG. 3 illustrates the image display of a 4:3 receiver, which reproduces active area 20 of FIG. 2 as active area 30 bordered by bar areas 31 and 32. The standard receiver horizontally compresses the 16:9 image format to the 4:3 image format by the factor 4/3, whereby the original spatial geometry of the circular image component of FIG. 1 is re-established. A viewer sees the original image information (FIG. 1), but with reduced vertical resolution and black bars 31 and 32 bordering the active image area. To prevent the additional signal components contained in the bar areas from becoming disturbingly visible, the amplitude of such components may be attenuated as needed by the 16:9 coder, and translated to the ultra black range (between sync level and black level). A large reduction in the magnitude of the additional signal components, however, may compromise the signal-to-noise ratio of the television signal at the 16:9 widescreen receiver due to the effects of superimposed channel noise. This additional noise is contained in the active image region of the signal.

The 16:9 receiver amplifies the additional signal components in the bar regions by the amount such components were attenuated in the coding process. The recovered and amplified additional components from the bar regions are used together with the active image information of area 30 and horizontal expansion to reconstruct the original 16:9 image (FIG. 1).

Figure 6A:
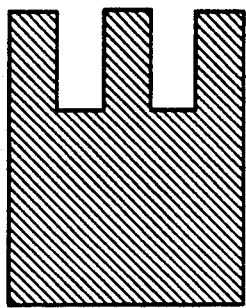
FIGS. 6A and 6B illustrates an image helpful in understanding the operation of the invention.
Figure 6B:
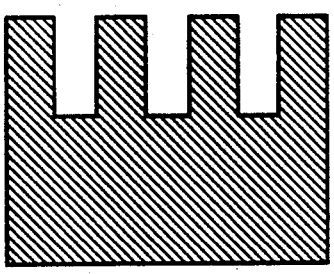

FIGS. 6A and 6B shows a portion of a dark image which moves horizontally in front of a light background. Because in a line interlaced image scanning system the two fields constituting each frame represent different aspects of image motion, corresponding image edges exhibit a "comb"-like structure as illustrated. If, in the process of vertical compression, every fourth image line is removed in such case, clearly visible distortion patterns will appear in a 4:3 receiver display. Vertical interpolation filters can help to avoid this effect in a 4:3 receiver display. However, with this technique high frequency vertical information is lost and is unavailable for use by a 16:9 receiver, producing a displayed image with reduced vertical resolution. From the illustrated "comb" structure it can be seen that, for good vertical image resolution, the highest frequencies of an image to be displayed by a widescreen 16:9 receiver (e.g., as represented by FIG. 6a), as well as in a compressed image to be displayed by a 4:3 receiver (e.g., as represented by FIG. 6B), must be transmitted. This requirement can be met by means of a suitable vertical transformation, for example using a DCT.

Figure 7:
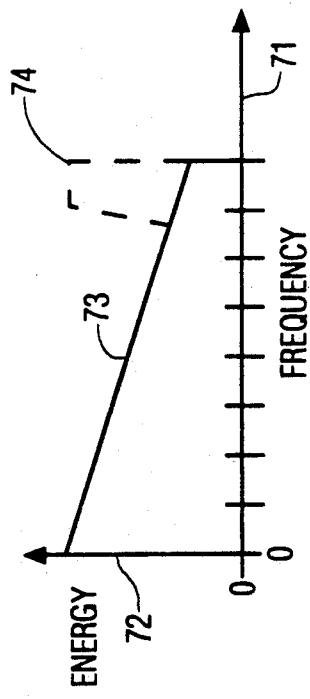
FIG. 7 depicts the average energy distribution of an eight coefficient discrete cosine transform.

In FIG. 7 the value 72 of the average energy content 73 of vertical transformation coefficients is shown as a function of frequency 71. In the case of a comb-type image structure as shown in FIG. 6a, the highest portion 74 of the energy spectrum contains markedly high values because the characteristic of the eighth (highest) transform coefficient exhibits similar structure.

In a DCT with eight coefficients, region 74 of the spectrum is represented by the eighth DCT coefficient. Through compression by a factor of 4/3, the eighth value becomes the sixth value. If the sixth and seventh coefficients are removed from the eight coefficient DCT, and the eighth coefficient is inserted at the position of the sixth coefficient, a comb structure as in FIG. 6b is generated upon inverse transformation. A DCT with an eight coefficient length becomes a DCT with a six coefficient length.

Figure 8:
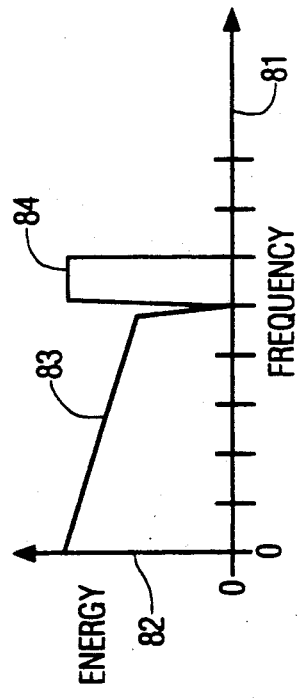
FIG. 8 depicts the coefficient energy distribution of a spatially compressed image signal.

FIG. 8 illustrates the corresponding spectrum of such a DCT with six coefficients. In this example the sixth and seventh coefficients are transmitted as additional (auxiliary) signal components in bar regions 21 and 22 (FIG. 2). The coefficient values are non-linearly compressed at the transmitter encoder, and inversely expanded by a decoder in a 16:9 receiver, resulting in an improved signal-to-noise ratio. The 4:3 receiver does not process these additional signal components. As indicated by FIG. 7, the statistical average of the values of the higher order DCT coefficients is significantly smaller than that of the lower order coefficients. Therefore reducing the magnitude of the higher order coefficients contained in the bar regions to avoid their being visible in a letterbox display by a 4:3 receiver may not be required, although a small reduction may be helpful. The coefficients in the bar regions advantageously do not represent image information such as is found in main image area 30. Instead, the coefficients represent spectral values of higher frequencies which appear to a viewer as high frequency noise. Such noise is less disturbing to a viewer than distorted image information in the bar regions.

Figure 4:
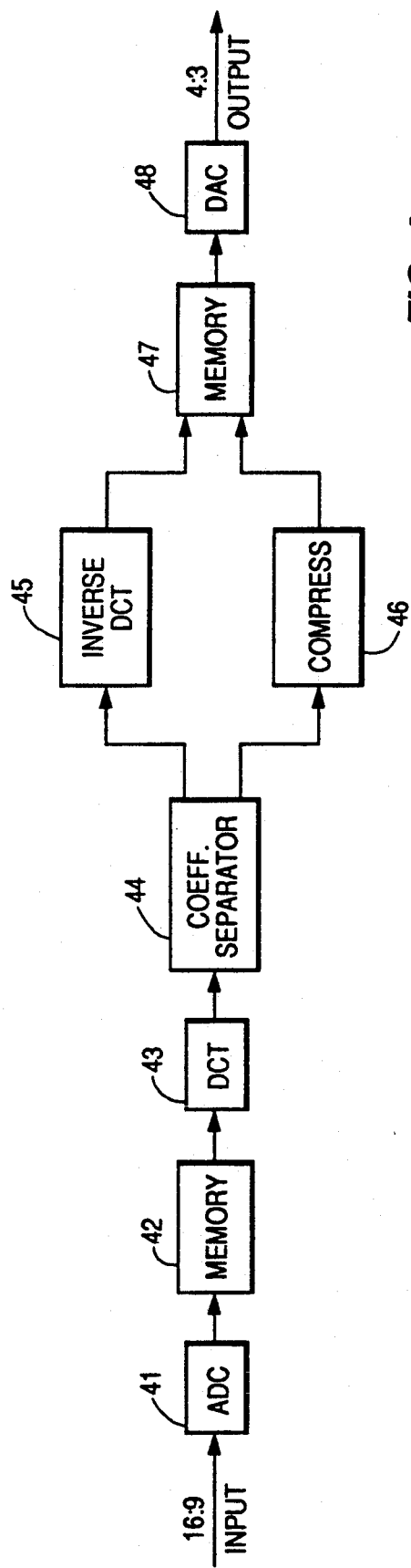
FIG. 4 is a block diagram of a 16:9 coder according to the present invention.

FIG. 4 is a block diagram of an image coder according to the present invention. An analog television signal with a 16:9 aspect ratio from a television camera, for example, is converted to digital form by an analog-to-digital converter (ADC) 41, and afterwards written into a memory 42. The scanning values of groups of eight picture elements (pels) arranged vertically with respect to each other are DCT transformed by a unit 43. For each transformation of a group of pels, the sixth and seventh DCT coefficients are separated by a unit 44, and non-linearly amplitude compressed by a unit 46. This can be achieved, for example, by means of the exponential function $y = x^{\frac{1}{3}}$ where x is the input signal and y is the output signal. The sixth and seventh coefficient values represent additional information which is conveyed in the letterbox bar region as discussed. The first through fifth and the eighth DCT coefficients are processed together as a six coefficient DCT in unit 44, and are inverse DCT transformed in a unit 45. Output signals from units 45 and 46 are written into a memory 47 before being converted back to analog form via a digital-to-analog converter (DAC) 48. These six coefficient values are used in conjunction with the active image display area, as discussed previously, to produce an image display without degraded vertical resolution in the letterbox display of a 16:9 image by a 4:3 receiver. The output signal from DAC 48 is an analog compatible television signal with a 4:3 aspect ratio letterbox format for processing by a standard 4:3 receiver.

Figure 5:
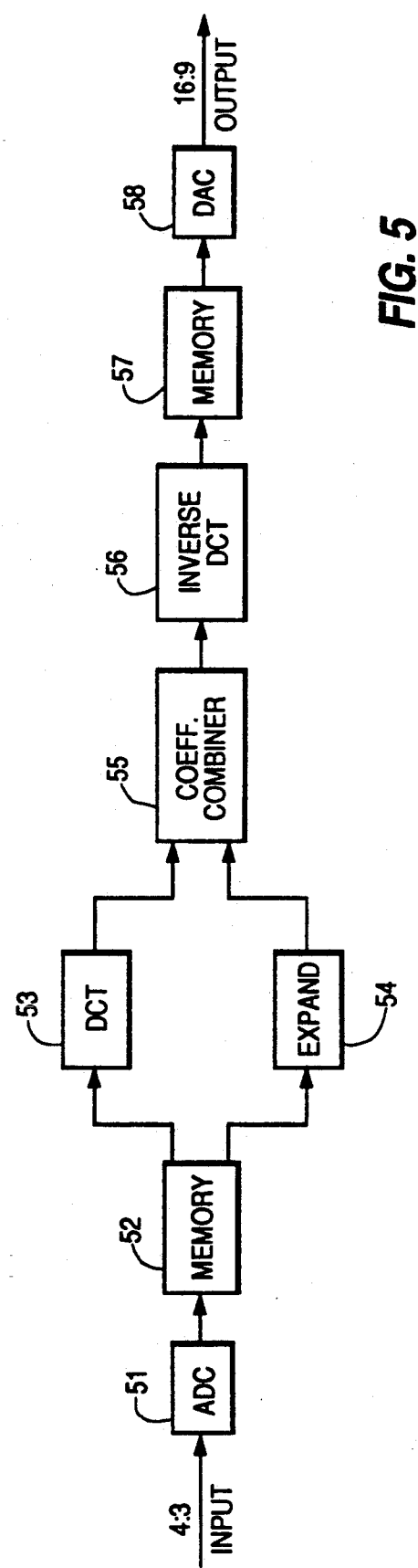
FIG. 5 is a block diagram of a 16:9 decoder according to the present invention.

FIG. 5 is a block diagram of a decoder in a 16:9 receiver. Input analog signals with a 4:3 aspect ratio are converted to digital form by an ADC unit 51 and written into a memory 52. The scanning values of groups of six pels arranged vertically with respect to each other are DCT transformed by a six coefficient DCT unit 53. The bar regions contain the sixth and seventh DCT coefficients of the original signal, now in digital from in memory 52. The sixth and seventh bar region coefficients are provided from memory 52 to a unit 54 where they are expanded with the inverse of the function of unit 46, i.e., nonlinearly. A unit 55 inserts the sixth DCT coefficient at the location of the original eighth coefficient, and inserts the sixth and seventh coefficients from unit 54 at the original sixth and seventh coefficient locations, respectively. Thus the original eight DCT coefficients are re-acquired. These are inversely DCT transformed by unit 56 and afterwards written into memory 57. This process is repeated for each group of pels. Output signals from memory 57 are converted to analog form by a digital to analog converter 58. An output signal from unit 58 exhibits a 16:9 image aspect ratio (FIG. 1) for display by a 16:9 widescreen receiver.

The described system can be used with television systems having a number of lines different from the present example. For example, in a television system with 525 lines and 481 active image lines, bar areas 21 and 22 may each contain 60 lines, and area 20 may contain 361 lines.

The described improved letterbox system offers several advantages. The quality of a displayed compatible 4:3 television image is improved insofar as artifacts such as motion related distortions caused by scanning characteristics are reduced or eliminated. The vertical resolution of a compatible receiver image is maintained, particularly for static images. An image displayed by a 16:9 receiver is less sensitive to the effects of transmission channel noise because such noise primarily affects the higher order spectral values. Also, the 16:9 receiver display offers full vertical resolution since all DCT coefficients are transmitted and recovered essentially unchanged.

Instead of employing a DCT and its inverse with eight and six coefficients as described, it is also possible to correspondingly use a DCT with four and three coefficients in an analogous manner.

Sharp cut-off filters also can be used instead of a DCT to produce analogous results. Spectral values which exceed, for example, $\frac{7}{8}$ of a maximum frequency ($f_{max}$) are cut off by a low pass filter. Spectral values in the range of 6/8 $f_{max}$ through $\frac{7}{8}$ $f_{max}$ are separated by means of a band pass filter and transmitted as an additional signal. Spectral values in the vicinity of $f_{max}$ are shifted to the vicinity of 6/8 $f_{max}$ by means of a suitable modulation process using an appropriate carrier frequency to produce sum and difference modulation components within a desired frequency range. Such modulation process to produce frequency shifting is well known. A decoder in a 16:9 receiver reverses this process.

The disclosed method can, with the shifting of DCT coefficients, also be used to provide DCT coefficients for enhancing image resolution in other cases of image format changes. For example, in a doubling of the number of lines, the highest coefficient from the image with the smaller number of lines can form the highest coefficient for the inverse DCT of doubled length for generating the high-definition signal, thereby increasing the vertical resolution of the high-definition signal.

The described system can be used advantageously in a system for processing a non-interlaced scan television signal containing image frames that is derived from the two image fields of an interlaced signal. When an image frame is created from two image fields each with dynamic image content, the comb-like structures of FIG. 6 can appear as disturbing artifacts. Such artifacts can be represented by the highest vertical DCT coefficient of an image frame. Thus to reduce or eliminate such artifacts, a vertical DCT can be performed, e.g., a DCT on groups of eight vertically arranged pels. The highest order (e.g., eighth) coefficient is inverse transformed, inverted and added back to the original frame image values to reduce or cancel the artifacts.

I claim:

1. In a system for generating a television signal compatible with a standard television receiver having a standard aspect ratio image display area, said television signal exhibiting a letterbox format in which (a) main image information is displayed with a wide aspect ratio relative to said standard aspect ratio within said display area, and (b) additional information is disposed in a region encompassed by said display area but external to displayed main image information, said additional information representing information for use by a widescreen receiver having a display area with a wide aspect ratio, together with said main image information, to produce a wide aspect ratio image utilizing said wide aspect ratio display area; apparatus comprising:

means for providing a widescreen television signal with image information having a wide aspect ratio;

means responsive to said widescreen television signal for transforming values of vertically arranged picture elements (pels) into spectral components;

means for shifting a predetermined intermediate spectral component between low and high frequency spectral components to said region, leaving remaining spectral components including said high frequency spectral component, said intermediate spectral component representing said additional information;

means for shifting said high frequency spectral component to a lower frequency range occupied by an intermediate spectral component; and means for inverse transforming said remaining spectral components to regenerate picture element values.

2. A system according to claim 1, wherein said transforming means produces a discrete cosine transform (DCT) of said pels with a first number of coefficients;

said inverse transforming means produces a DCT with a second number of coefficients less than said first number; and the ratio of said first and second numbers corresponds to the ratio of said image aspect ratios.

3. A system according to claim 1, wherein said transforming means vertically transforms respective groups of pels comprising at least four pels.

4. A system according to claim 2, wherein said transforming means produces a DCT comprising at least four coefficients.

5. A system according to claim 2, wherein said transforming means produces eight coefficients, wherein an eighth coefficient represents a highest frequency value, and intermediate six and seventh coefficients represent lower frequency values.

6. A system according to claim 2, wherein said transforming means produces four coefficients, wherein a fourth coefficient represents a highest frequency value and a third coefficient represents a lower frequency value.

7. A system according to claim 1, and further including means for attenuating said additional information.

8. A system according to claim 1, wherein said apparatus comprises:

input analog to digital converter means for converting said television signal to digital form;

memory means for storing an output signal from said input converter means;

DCT transformer means for transforming an output signal from said memory means;

separator means for providing DCT coefficients representing intermediate frequency values at a first output and providing remaining DCT coefficients representing remaining frequency values, including highest frequency values, at a second output;

means for nonlinearly compressing signals received from said first output of said separator means;

means for inverse transforming signals received from said second output of said separator means;

memory means for storing output signals from said compressing means and from said inverse transforming means; and digital to analog signal converter means for converting an output signal from said memory means to an analog signal, said analog output signal representing an image with said standard aspect ratio.

9. In a system for processing a non-interlaced television signal comprising image frames composed of information obtained from sequential interlaced image fields, apparatus comprising:

means for frequency transforming original values of a prescribed number of vertically arranged pels within an image frame to produce a plurality of frequency representative coefficients;

means for inverse frequency transforming a high order coefficient representing highest frequency information including unwanted artifacts; and means for combining said inverse transformed value with said original values so as to substantially cancel said unwanted artifacts.

10. Apparatus according to claim 9, wherein said transforming means produces a DCT transform; and said inverse transformed value is combined in inverted form with said original values.

11. In a wide image aspect ratio television receiver system for processing a television signal with a letterbox image format in which (a) main image information having a wide image aspect ratio is disposed within a standard aspect ratio area, and (b) additional information is disposed in a region along an edge of said main information, said additional information representing information for use with said main image information to produce a wide aspect ratio image in a wide aspect ratio display area; apparatus comprising:

means for transforming values of vertically arranged picture elements (pels) associated with said main image information into spectral components;

means for combining said spectral components with spectral components derived from said additional information, also representative of values of vertically arranged pels, so as to produce an ordering of spectral components from low frequency to high frequency; and means for inverse transforming spectral components from said combining means into pel values to produce an output signal, said output signal representing a wide image aspect ratio image.

12. A system according to claim 11, wherein said transforming means produces a discrete cosine transform.

13. A system according to claim 11 and further including means for expanding said additional information prior to said combining means.

14. A system according to claim 11, wherein said apparatus comprises input analog to digital converter means for converting a received television signal to digital form;

memory means for storing an output signal from said input converter means;

DCT transformer means for transforming an output signal from said memory means;

nonlinear expander means for expanding an output signal from said memory means;

means for combining output signals from said DCT transformer means and said expander means for producing an output signal with DCT coefficients ordered from lowest to highest frequency representative coefficients;

means for inverse DCT transforming said output signal from said combining means; and means responsive to an output signal from said inverse DCT transforming means for producing an output signal representing a wide aspect ratio image for display by a widescreen image display device.

* * * * *